(12) United States Patent
Tsuchiya

(10) Patent No.: US 8,057,943 B2
(45) Date of Patent: Nov. 15, 2011

(54) FUEL CELL RUNNING SYSTEM, AND VALVE-FREEZE PREVENTING METHOD IN THE FUEL CELL RUNNING SYSTEM

(75) Inventor: Naohisa Tsuchiya, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 542 days.

(21) Appl. No.: 12/294,519

(22) PCT Filed: Apr. 4, 2007

(86) PCT No.: PCT/JP2007/057933
§ 371 (c)(1),
(2), (4) Date: Sep. 25, 2008

(87) PCT Pub. No.: WO2007/117018
PCT Pub. Date: Oct. 18, 2007

(65) Prior Publication Data
US 2010/0239928 A1 Sep. 23, 2010

(30) Foreign Application Priority Data
Apr. 7, 2006 (JP) .................................. 2006-106398

(51) Int. Cl.
H01M 8/04 (2006.01)
(52) U.S. Cl. ........................................ 429/429; 429/456
(58) Field of Classification Search .................. 429/429, 429/456
See application file for complete search history.

(56) References Cited

U.S. PATENT DOCUMENTS

| 6,488,345 | B1 * | 12/2002 | Woody et al. | 303/152 |
|---|---|---|---|---|
| 2001/0055707 | A1 | 12/2001 | Roberts et al. | |
| 2003/0077488 | A1 | 4/2003 | Yamamoto et al. | |
| 2005/0129990 | A1 * | 6/2005 | Ozeki et al. | 429/12 |
| 2005/0136302 | A1 * | 6/2005 | Shoji et al. | 429/22 |
| 2009/0098426 | A1 * | 4/2009 | Tsuchiya et al. | 429/23 |

FOREIGN PATENT DOCUMENTS

| DE | 10 2004 055 728 A1 | 7/2005 |
|---|---|---|
| EP | 1 383 193 A1 | 1/2004 |
| JP | 2003-132915 A | 5/2003 |
| JP | 2003-180006 A | 6/2003 |
| JP | 2003-203665 A | 7/2003 |
| WO | WO 03/058740 A1 | 7/2003 |

* cited by examiner

Primary Examiner — Gregg Cantelmo
(74) Attorney, Agent, or Firm — Kenyon & Kenyon LLP

(57) ABSTRACT

A fuel cell operating system which can prevent freezing of a valve and a method of preventing fixation of the valve in the fuel cell operating system are provided. In steps of the process of preventing freezing of a valve in the present invention, first, supply of hydrogen, which is a fuel gas, is stopped. Power generation is continued in a fuel cell stack until the fuel gas which has already been supplied is consumed by the fuel cell reaction. It is constantly judged whether or not the power generation is stopped. When it is judged that the power generation is stopped, a function of a water discharge process module executes a process to open a bypass valve. When the bypass valve is opened, a large amount of pressurized air is supplied to a bypass flow path, and water present in the bypass flow path and water present in an exit-side flow path are forcibly pushed and discharged.

5 Claims, 2 Drawing Sheets

FUEL CELL RUNNING SYSTEM, AND VALVE-FREEZE PREVENTING METHOD IN THE FUEL CELL RUNNING SYSTEM

This is a 371 national phase application of PCT/JP2007/057933 filed 4 Apr. 2007, claiming priority to Japanese Patent Application No. JP 2006-106398 filed 7 Apr. 2006, the contents of which are incorporated herein by reference.

TECHNICAL FIELD

The present invention relates to a fuel cell operating system and a method of preventing freezing of a valve in a fuel cell operating system, and, in particular, to a fuel cell operating system for a fuel cell using hydrogen as a fuel gas, which has a valve for adjusting a flow of oxidizing gas on a side of a cathode, and to a method of preventing freezing of a valve in the fuel cell operating system.

BACKGROUND ART

As a fuel cell, a system is known in which hydrogen is supplied as a fuel gas on a side of an anode and air is supplied as an oxidizing gas on a side of the cathode, with a membrane electrode assembly (MEA) therebetween, the membrane electrode assembly being a layered structure of a solid electrolytic membrane and a catalyst layer. In this fuel cell operating system, electric power is generated in the cell including the MEA through a reaction of the hydrogen and oxygen in the air, and water is discharged from the side of the cathode as a reaction product. In order to adjust an amount of air supplied to the side of the cathode, an adjusting valve, which is called a back pressure valve or a pressure adjusting valve, is provided at an exit on the side of the cathode of the fuel cell.

In addition, because the MEA is a layered structure of membranes, hydrogen may partially leak from the side of the anode to the side of the cathode. The leaked hydrogen and the unreacted hydrogen at the side of the anode are diluted by the air and are discharged. For this purpose, a bypass flow path is provided on the side of the cathode in order to distribute the air, which is the oxidizing gas, into the gas for reaction in the cell and the gas for dilution, and a bypass valve is provided on the bypass flow path.

For example, JP 2003-180006A discloses a regeneration braking system for a fuel cell vehicle which does not use an expensive battery pack. In this reference, a back pressure valve is provided between an exit of the fuel cell on the side of the cathode and an air release end, and a bypass valve which is a three-way valve for bypass to the air release end is provided between a compressor for supplying compressed air and the cathode.

As described, in a fuel cell operating system using hydrogen as a fuel gas, with operations of several valves along with the supply of hydrogen gas and the supply of the air, suitable extraction of generated power, discharge of water which is the reaction product of the power generation, and dilution of the discharge gas are achieved.

As described above, water, which is the reaction product, is present in the gas supply path of the fuel cell system. Because of this, the adjusting valve and the bypass valve provided on the gas supply path may be fixed in same place due to freezing or the like of the water by lowering of the environmental temperature, resulting in non-operation during activation.

As described, the adjusting valve and the bypass valve are used in a fuel cell operating system. Because a primary function of the bypass valve is to supply air for diluting the concentration of the hydrogen contained in the discharge gas, the bypass valve is in many cases completely closed during normal operation. Therefore, when water is present near the bypass valve, the water is frozen when the outside air temperature is reduced to subzero temperatures, and activating the bypass valve becomes difficult.

An object of the present invention is to provide a fuel cell operating system which can prevent freezing of the valve and a method of preventing fixation of the valve in the fuel cell operating system.

DISCLOSURE OF INVENTION

According to one aspect of the present invention, there is provided a fuel cell operating system comprising a fuel cell, a fuel gas supplying device which supplies a fuel gas to a side of an anode of the fuel cell, an oxidizing gas supplying device which supplies an oxidizing gas to a side of a cathode of the fuel cell, an entrance-side flow path which connects the oxidizing gas supplying device and a gas entrance on the side of the cathode of the fuel cell, an exit-side flow path which is connected between a gas exit on the side of the cathode of the fuel cell and a side of discharge, a bypass flow path which connects the entrance-side flow path and the exit-side flow path and which is placed in parallel to the fuel cell, an adjusting valve which is provided on at least one of the entrance-side flow path and the exit-side flow path and which adjusts a gas flow rate on the side of the cathode, a bypass valve which is provided on the bypass flow path and which adjusts a gas flow rate in the bypass flow path, and a controller which controls an operation of the fuel cell, wherein the controller comprises a unit which detects and judges that power generation by the fuel cell is stopped, and a unit which, after the power generation by the fuel cell is judged to have stopped, opens the bypass valve, to thereby discharge water present in the exit-side flow path and in the bypass flow path.

According to another aspect of the present invention, there is provided a fuel cell operating system comprising a fuel cell, a fuel gas supplying device which supplies a fuel gas to a side of an anode of the fuel cell, an oxidizing gas supplying device which supplies an oxidizing gas to a side of a cathode of the fuel cell, an entrance-side flow path which connects the oxidizing gas supplying device and a gas entrance on the side of the cathode of the fuel cell, an exit-side flow path which is connected between a gas exit on the side of the cathode of the fuel cell and a side of discharge, a bypass flow path which connects the entrance-side flow path and the exit-side flow path and which is placed in parallel to the fuel cell, an adjusting valve which is provided on at least one of the entrance-side flow path and the exit-side flow path and which adjusts a gas flow rate on the side of the cathode, a bypass valve which is provided on the bypass flow path and which adjusts a gas flow rate in the bypass flow path, and a controller which controls an operation of the fuel cell, wherein the controller comprises a unit which detects and judges that power generation by the fuel cell is stopped, and a unit which, after the power generation by the fuel cell is judged to have stopped, supplies the oxidizing gas from the oxidizing gas supplying device for a predetermined extension time, to thereby discharge water present in the exit-side flow path and in the bypass flow path.

According to another aspect of the present invention, preferably, in the fuel cell operating system, the controller further comprises a low-temperature process unit which judges whether or not a temperature of the fuel cell operating system satisfies a predetermined low temperature condition, and, when the low-temperature process unit judges that the predetermined low temperature condition is satisfied, causes execution of the detecting and judging process of stopping of the power generation and the water discharge process.

According to another aspect of the present invention, there is provided a method of preventing freezing of a valve in a fuel cell operating system comprising a fuel cell, a fuel gas supplying device which supplies a fuel gas to a side of an anode of the fuel cell, an oxidizing gas supplying device which supplies an oxidizing gas to a side of a cathode of the fuel cell, an entrance-side flow path which connects the oxidizing gas supplying device and a gas entrance on the side of the cathode of the fuel cell, an exit-side flow path which is connected between a gas exit on the side of the cathode of the fuel cell and a side of discharge, a bypass flow path which connects the entrance-side flow path and the exit-side flow path and which is placed in parallel to the fuel cell, an adjusting valve which is provided on at least one of the entrance-side flow path and the exit-side flow path and which adjusts a gas flow rate on the side of the cathode, a bypass valve which is provided on the bypass flow path and which adjusts a gas flow rate in the bypass flow path, and a controller which controls an operation of the fuel cell, the method comprising the steps of detecting and judging that power generation by the fuel cell is stopped, and, after the power generation by the fuel cell is judged to have stopped, opening the bypass valve, to thereby discharge water present in the exit-side flow path and in the bypass flow path.

With the above-described structure, in the fuel cell operating system, on the side of the cathode, the adjusting valve is provided on at least one of the entrance-side flow path and the exit-side flow path and the bypass valve is provided in parallel to the fuel cell and connecting the entrance-side flow path and the exit-side flow path. Stopping of the power generation by the fuel cell is detected and judged, and, after the power generation by the fuel cell is judged to have stopped, the bypass valve is opened and water present in the exit-side flow path and in the bypass flow path is discharged.

Therefore, because the water present in the exit-side flow path and in the bypass flow path is discharged when the power generation by the fuel cell is stopped, the exit-side flow path and the bypass flow path do not freeze even when the outside air temperature is lowered, and, thus, the freezing of the valves provided on the exit-side flow path and on the bypass flow path can be prevented.

Alternately, stopping of the power generation by the fuel cell is detected and judged, and, after the power generation by the fuel cell is judged to have stopped, the oxidizing gas is supplied from the oxidizing gas supplying device for a predetermined extension time, to thereby discharge water present in the exit-side flow path and in the bypass flow path.

Therefore, because the water present in the exit-side flow path and in the bypass flow path is discharged when the power generation by the fuel cell is stopped, the exit-side flow path and the bypass flow path do not freeze even when the outside air temperature is lowered, and, thus, the freezing of the valves provided on the exit-side flow path and on the bypass flow path can be prevented.

Alternatively, because it is judged as to whether or not the temperature of the fuel cell operating system satisfies a predetermined low temperature condition and the detecting and judging process of the stopping of the power generation and the water discharge process are executed when it is judged that the low temperature condition is satisfied, these processes can be executed only in a suitable case where there is a possibility of freezing.

BEST MODE FOR CARRYING OUT THE INVENTION

Figure 1:
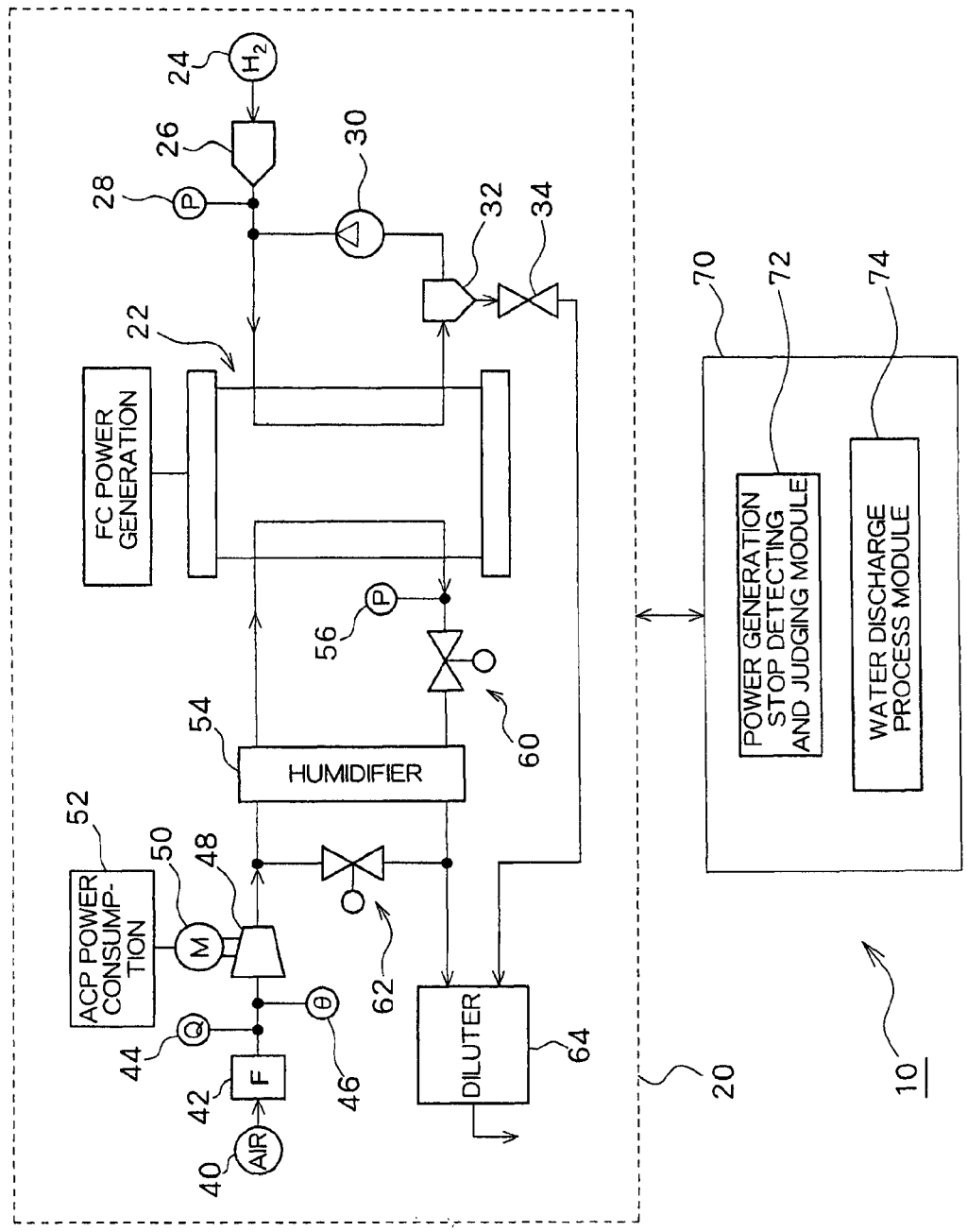
FIG. 1 is a structural diagram of a fuel cell operating system of a preferred embodiment according to the present invention.

A preferred embodiment of the present invention will now be described in detail with reference to the diagrams. FIG. 1 is a structural diagram of a fuel cell operating system 10. The fuel cell operating system 10 comprises a system body section 20, and a controller 70 which controls the constituent elements of the system body section 20 as a whole system.

The system body section 20 comprises a fuel cell body which is called a fuel cell stack 22 and in which a plurality of fuel cells are stacked, constituent elements for supplying hydrogen gas which is a fuel gas provided on the side of an anode of the fuel cell stack 22, and constituent elements for supplying air which is an oxidizing gas provided on a side of a cathode of the fuel cell stack 22.

A fuel gas supplying source 24 on the side of the anode is a tank for supplying hydrogen as the fuel gas. The fuel gas supplying source 24 is connected to a regulator 26. The regulator 26 has a function to adjust a pressure and a flow rate of the hydrogen gas from the fuel gas supplying source 24 to the fuel cell stack 22. A pressure gauge 28 provided at an output exit of the regulator 26 is a measurement device which detects a pressure of the supplied hydrogen. The output exit of the regulator 26 is connected to an entrance on the side of an anode of the fuel cell stack 22, and hydrogen gas having the pressure and the flow rate adjusted to suitable values is supplied to the fuel cell stack 22.

In the gas discharged from an exit on the side of the anode of the fuel cell stack 22, the hydrogen concentration is low, because the hydrogen is consumed in the power generation, and a concentration of impurity gas is high, because nitrogen gas, which is a constituent of the air on the side of the cathode, is permeated from the side of the cathode through the MEA. In addition, water, which is the reaction product, also permeates through the MEA.

A flow diverter 32 connected to an exit on the side of the anode of the fuel cell stack 22 is provided for leading the discharge gas to a diluter 64 through a discharge valve 34 when the concentration of impurity gas in the discharge gas from the exit on the side of the anode becomes high. The discharge gas in this case is hydrogen gas including nitrogen and water, which is the reaction product. A circulating pressure raising device 30 provided downstream of the flow diverter 32 and between the flow diverter 32 and the entrance on the side of the anode is a hydrogen pump having a function to increase the partial pressure of the hydrogen in the gas returning from the exit on the side of the anode and to return the gas to the entrance on the side of the anode for reuse.

As an oxidizing gas supplying source 40 on the side of the cathode, in reality, atmospheric air may be used. The atmospheric air (air), which serves as the oxidizing gas supplying source 40, is supplied through a filter 42 and then to the side of the cathode. A flowmeter 44 which is provided downstream of the filter 42 is a flowmeter which detects a flow rate of the entire supply from the oxidizing gas supplying source 40. A thermometer 46 provided downstream of the filter 42 has a function to detect a temperature of the gas from the oxidizing gas supplying source 40.

An air compressor (ACP) 48 is a gas pressure raising device which compresses volume of the air, which serves as the oxidizing gas, by means of a motor 50, to thereby increase the pressure of the air. The ACP (48) also has a function to vary a rotation speed (number of rotations per minute) under the control of the controller 70, to thereby provide a predetermined amount of oxidizing gas. In other words, when the required flow rate of the oxidizing gas is large, the rotation speed of the motor 50 is increased and, when the required flow rate of the oxidizing gas is small, the rotation speed of the motor 50 is reduced. An ACP power consumption detecting unit 52 is a measurement device having a function to detect power consumption of the ACP (48); more specifically, power consumption of the motor 50. When the rotation speed of the motor 50 is increased, the power consumption of the motor 50 is increased and, when the rotation speed of the motor 50 is reduced, the power consumption of the motor 50 is reduced. Therefore, the power consumption is closely related to the rotation speed of the motor, or the flow rate of the oxidizing gas.

In this manner, air is supplied as the oxidizing gas to the side of the cathode of the fuel cell stack 22 by the ACP (48) under the control of the controller 70. In other words, in this structure, the oxidizing gas, atmospheric air, and air are equivalent. Therefore, the constituent elements from the oxidizing gas supplying source 40 to the ACP (48) can be called an oxidizing gas supplying device.

A humidifier 54 has a function to suitably humidify oxidizing gas, to thereby achieve efficient fuel cell reaction in the fuel cell stack 22. The oxidizing gas which has been suitably humidified by the humidifier 54 is supplied to the entrance on the side of the cathode of the fuel cell stack 22 and is discharged from the exit on the side of the cathode. During this process, water, which is the reaction product, is also discharged along with the discharge gas. Because the temperature of the fuel cell stack 22 becomes high by the reaction, the discharged water is in the form of water vapor, which is supplied to the humidifier 54 for suitably humidifying the oxidizing gas. As described, the humidifier 54 has a function to suitably add moisture of the water vapor to the oxidizing gas, and a gas exchanger which uses a hollow fiber may be used. That is, the humidifier 54 has a structure to exchange gas between a flow path through which the gas from the ACP (48) flows and the flow path through which the water vapor flows. For example, the inner flow path of the hollow fiber may be set as the flow path of the oxidizing gas from the ACP (48) and the outer flow path of the hollow fiber can be set as the flow path of the water vapor from the exit on the side of the cathode of the fuel cell stack 22, so that the oxidizing gas flowing to the entrance on the side of the cathode of the fuel cell stack 22 can be suitably humidified.

A flow path connecting the oxidizing gas supplying device and the entrance on the side of the cathode of the fuel cell stack 22 can be called an entrance-side flow path. Similarly, the flow path connected from the exit on the side of the cathode of the fuel cell stack 22 to the side of the discharge can be called an exit-side flow path.

A pressure gauge 56 provided on an exit on a side of the cathode of the exit-side flow path has a function to detect a gas pressure at the exit on the side of the cathode. An adjusting valve 60 provided on the exit-side flow path is also called a back pressure valve, and has a function to adjust a gas pressure at the exit on the side of the cathode and adjust the flow rate of the oxidizing gas to the fuel cell stack 22. As the adjusting valve 60, a valve which can adjust an effective aperture of the flow path such as, for example, a butterfly valve is preferably used. The adjusting valve 60 in some cases may be provided on the entrance-side flow path.

An output exit of the adjusting valve 60 is connected to the humidifier 54. Therefore, the gas exiting the adjusting valve 60 is returned again after the gas supplies water vapor to the humidifier 54, enters the diluter 64, and is discharged to the outside.

A bypass valve 62 is a valve provided on a bypass flow path which connects the entrance-side flow path and the exit-side flow path and which is placed in parallel to the fuel cell stack 22, and has a primary function to supply, to the diluter 64, air for diluting the hydrogen concentration in the discharge. In other words, by opening the bypass valve 62, it is possible to supply a part of the oxidizing gas from the ACP (48), separate from the part flowing to the fuel cell stack 22, to the diluter 64 via the bypass flow path without flowing through the fuel cell stack 22. As the bypass valve 62, there may be used a value having a structure similar to that of the discharge bypass valve used for discharge gas dilution of the engine.

The diluter 64 is a buffer container which collects discharge water, to which hydrogen is mixed, from the discharge valve 34 on the side of the anode, and discharge gas, to which water vapor is mixed and to which hydrogen leaking through the MEA is mixed, on the side of the cathode; adjusts the hydrogen concentration to a suitable value; and discharges the mixture to the outside. When the hydrogen concentration exceeds a suitable concentration, the bypass valve 62 may be opened so that the oxidizing gas which is supplied without flowing through the fuel cell stack 22 is used for a further suitable dilution.

The controller 70 controls the above-described constituent elements of the system body section 20 as a whole system, and is commonly called a fuel cell CPU. The controller 70 comprises, in particular, a power generation stop detecting and judging module 72 which detects and judges the power generation by the fuel cell is stopped, and a water discharge process module 74 which forcibly discharges water present in the exit-side flow path and in the bypass flow path by supplying oxidizing gas, after power generation by the fuel cell is judged to have stopped. An example of the judgment of the power generation stopping is a case in which, during stopping of the operation of the fuel cell, the hydrogen gas which has already been supplied is consumed by the fuel cell reaction and the power generation is stopped. These functions can be realized with software; more specifically, by executing a corresponding fuel cell operating program or a valve freezing preventing program included in the fuel cell operating program. Alternatively, a part of these functions may be realized with hardware.

Figure 2:
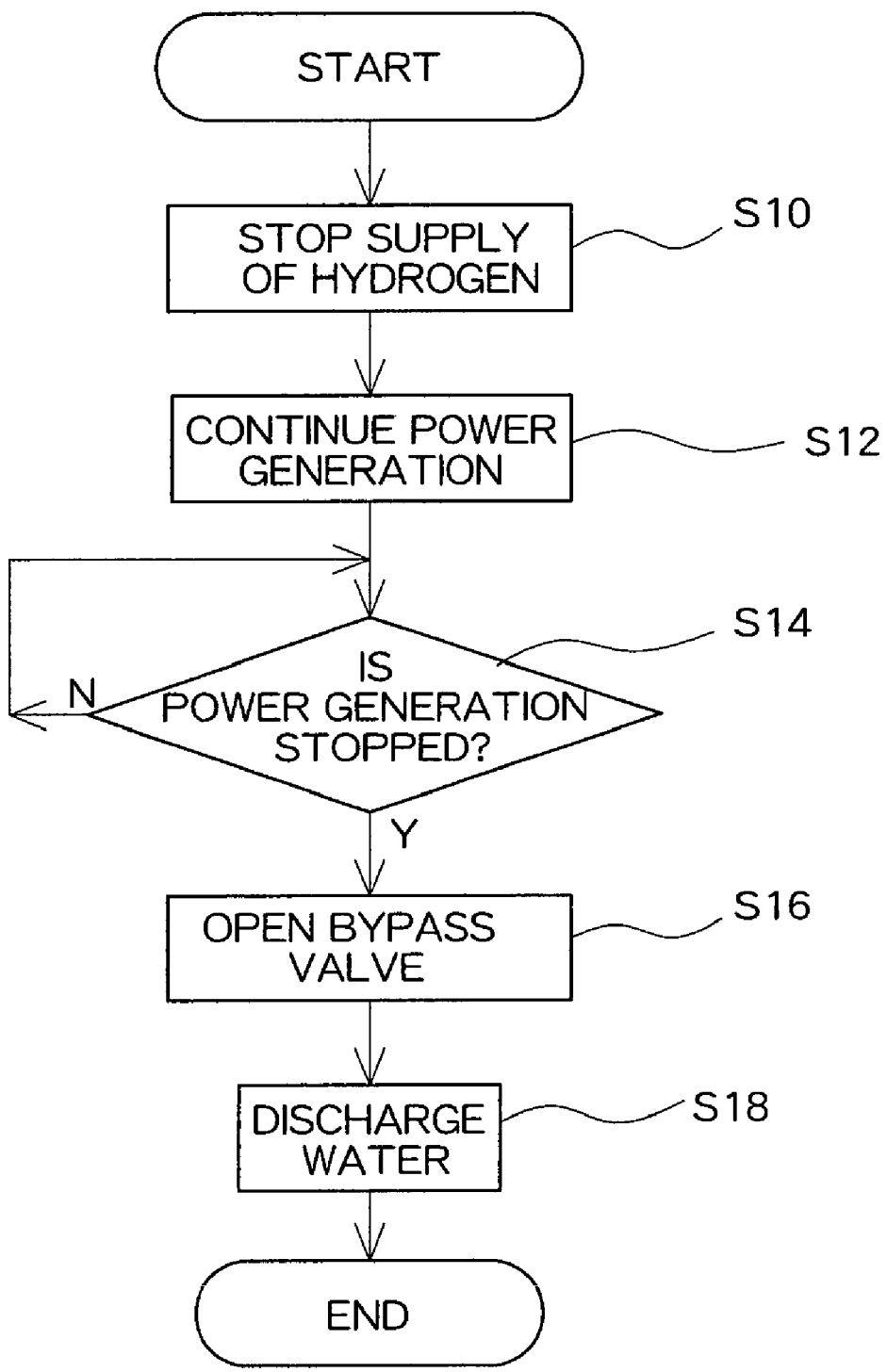
FIG. 2 is a flowchart showing steps for preventing freezing of a valve in a preferred embodiment according to the present invention.

An operation of the fuel cell operating system 10 having the above-described structure; in particular, the functions of the controller 70, will now be described in detail by reference to a flowchart of FIG. 2. FIG. 2 shows steps for prevent freezing of the valve, among the operations of the fuel cell operating system 10. Each step corresponds to a respective processing step of the valve freezing preventing program.

The valve freezing preventing process of the fuel cell operating system 10 is normally automatically executed at the time of stopping of operation of the fuel cell operating system 10, but may alternatively be executed at an arbitrary timing as necessary, automatically according to detection of an operation state, or manually by an input of an instruction by an operator.

The valve freezing occurs when the outside air temperature satisfies a predetermined low temperature condition; for example, when the outside air temperature is a subzero temperature. Therefore, the valve freezing preventing process is preferably executed by estimating and judging whether or not the outside air temperature satisfies a predetermined low temperature condition. Because the temperature of the oxidizing gas is detected by the thermometer 46, it is possible to estimate and judge whether or not the outside air temperature satisfies a predetermined low temperature condition, for example, a subzero temperature, based on the change with respect to time of the temperature of the oxidizing gas. When, based on the judgment, the outside air temperature is estimated to become a subzero temperature, the following valve freeze process is executed. Alternatively, there may be employed a configuration in which the steps of the valve freeze process are executed when the low temperature condition of subzero is satisfied; for example, when the outside air temperature becomes lower than a preset temperature.

In the steps of the process for preventing valve freezing, first, supply of hydrogen, which is the fuel gas, is stopped (S10). More specifically, a function of the power generation stop detecting and judging module 72 of the controller 70 gives the regulator 26 an instruction to stop hydrogen supply, the regulator 26 closes the gas supplying port in response to the instruction, and the system is operated to not supply the fuel gas from the fuel gas supplying source 24 to the fuel cell stack 22. Even when the hydrogen supply is stopped, the operation of the ACP (48) is continued, and the oxidizing gas, which is air, continues to be supplied to the fuel cell stack 22. Therefore, the power generation is continued in the fuel cell stack 22 until the fuel gas which has already been supplied is consumed by the fuel cell reaction (S12).

It is constantly judged whether or not the power generation is stopped (S14). The judgment may be executed, for example, by providing a unit for detecting a partial pressure of hydrogen in the hydrogen supplying flow path on the side of the anode including the circulating pressure raising device 30 and judging whether or not the partial pressure of hydrogen is less than or equal to a predetermined value. The judgment of whether or not the power generation is stopped is continued until the power generation is judged to have been stopped. Alternatively, it is also possible to judge that the power generation is stopped when a predetermined time which is defined in advance elapses from the time of instruction to stop hydrogen supply. The predetermined time in this case may be defined based on a volume of the fuel cell stack 22 and the supply state of the oxidizing gas from the ACP (48). The steps up to S14 are executed by a function of the above-described power generation stop detecting and judging module.

When it is judged that the power generation is stopped, a function of the water discharge process module 74 executes a process to open the bypass valve 62 (S16). When the bypass valve 62 is opened, a large amount of pressurized air is supplied to the bypass flow path, and the water present in the bypass flow path and the water present in the exit-side flow path are forcibly pushed and discharged (S18). For this purpose, it is desirable that the bypass valve 62 be completely opened. Alternatively, in order to efficiently push the water, it is possible to intermittently open and close the bypass valve 62.

The opening of the bypass valve 62 may alternatively be controlled by temporal management. In this case, the time when the bypass valve 62 is to be opened may be defined by the flow rate and pressure or the like of the oxidizing gas flowing in the bypass flow path. Alternatively, it is also possible to employ a configuration in which a differential pressure between each end of the bypass flow path and a differential pressure between each end of the exit-side flow path are detected, and the bypass valve 62 is opened until the differential pressure of the flow path becomes less than or equal to a predetermined value. Specifically, when water remains in the flow path, the air, which is the oxidizing gas, does not flow smoothly and the differential pressure between each end of the flow path is large, and, when the water is sufficiently removed, the differential pressure between each end of the flow path becomes sufficiently low.

When the bypass valve 62 is already in the opened state when the power generation is judged to have stopped, it is desirable to once close the bypass valve 62 and then re-open the bypass valve 62. Alternatively, as described above, it is also possible to control the bypass valve 62 to intermittently open and close the bypass valve 62.

After the power generation is judged to have stopped, the water, which is the reaction product, is not generated. Because of this, it is possible to not stop the supply of the air which is the oxidizing gas after the judgment of the power generation stopping and continue supplying the air which is the oxidizing gas for a predetermined extension time, to thereby forcibly discharge the water present in the exit-side flow path and in the bypass flow path. The setting of the predetermined time in this case can be defined by the flow rate, pressure, or the like of the oxidizing gas. Alternatively, when a differential pressure detecting unit is provided between each end of the flow path, a time period in which the differential pressure between each end of the flow path becomes sufficiently low can be set as the predetermined extension time.

When the water discharge process is completed, the bypass valve 62 or the like is set in a standard operation stopping setting condition of the fuel cell operating system 10. For example, on the side of the anode, the supply of the hydrogen gas is set to be stopped by the regulator 26, and, on the side of the cathode, the operation of the ACP 48 is stopped and the bypass valve 62 is closed.

As described, because the water present in the bypass flow path and in the exit-side flow path is forcibly discharged when the operation of the fuel cell operating system is stopped, the freezing of the valve by the outside air temperature at a later time can be prevented.

INDUSTRIAL APPLICABILITY

The present invention is applied in a fuel cell operating system and a method of preventing freezing of a valve in the fuel cell operating system. In particular, the present invention is applied in a fuel cell operating system having a valve which adjusts flow of an oxidizing gas on a side of a cathode in a fuel cell using hydrogen as a fuel gas and a method of preventing freezing of a valve in a fuel cell operating system.

The invention claimed is:

1. A fuel cell operating system comprising:
a fuel cell;
a fuel gas supplying device which supplies a fuel gas to a side of an anode of the fuel cell;
an oxidizing gas supplying device which supplies an oxidizing gas to a side of a cathode of the fuel cell;
an entrance-side flow path which connects the oxidizing gas supplying device and a gas entrance on the side of the cathode of the fuel cell;
an exit-side flow path which is connected between a gas exit on the side of the cathode of the fuel cell and a side of discharge;
a bypass flow path which connects the entrance-side flow path and the exit-side flow path and which is placed in parallel to the fuel cell;
an adjusting valve which is provided on at least one of the entrance-side flow path and the exit-side flow path and which adjusts a gas flow rate on the side of the cathode;
a bypass valve which is provided on the bypass flow path and which adjusts a gas flow rate in the bypass flow path; and a controller which controls an operation of the fuel cell, wherein the controller comprises:
- a unit programmed to detect and to judge that power generation by the fuel cell is stopped; and
- a unit programmed to open the bypass valve and to supply the oxidizing gas through the exit-side flow path and the bypass flow path to an outside air release end after the power generation by the fuel cell is judged to have stopped, to thereby discharge water present in the exit-side flow path and in the bypass flow path.

2. The fuel cell operating system according to claim 1, wherein the controller further comprises a low-temperature process unit which judges whether or not a temperature of the fuel cell operating system satisfies a predetermined low temperature condition, and, when the low-temperature process unit judges that the predetermined low temperature condition is satisfied, causes execution of the detecting and judging process of stopping of the power generation and the water discharge process.

3. A fuel cell operating system comprising:
a fuel cell;
a fuel gas supplying device which supplies a fuel gas to a side of an anode of the fuel cell;
an oxidizing gas supplying device which supplies an oxidizing gas to a side of a cathode of the fuel cell;
an entrance-side flow path which connects the oxidizing gas supplying device and a gas entrance on the side of the cathode of the fuel cell;
an exit-side flow path which is connected between a gas exit on the side of the cathode of the fuel cell and a side of discharge;
a bypass flow path which connects the entrance-side flow path and the exit-side flow path and which is placed in parallel to the fuel cell;
an adjusting valve which is provided on at least one of the entrance-side flow path and the exit-side flow path and which adjusts a gas flow rate on the side of the cathode;
a bypass valve which is provided on the bypass flow path and which adjusts a gas flow rate in the bypass flow path; and
a controller which controls an operation of the fuel cell, wherein
the controller comprises:
- a unit programmed to detect and to judge that power generation by the fuel cell is stopped; and
- a unit programmed to open the bypass valve and to continue to supply the oxidizing gas from the oxidizing gas supplying device through the exit-side flow path and the bypass flow path to an outside air release end for a predetermined extension time after the power generation by the power cell is judged to have stopped, to thereby discharge water present in the exit-side flow path and in the bypass flow path.

4. The fuel cell operating system according to claim 3, wherein the controller further comprises a low-temperature process unit which judges whether or not a temperature of the fuel cell operating system satisfies a predetermined low temperature condition, and, when the low-temperature process unit judges that the predetermined low temperature condition is satisfied, causes execution of the detecting and judging process of stopping of the power generation and the water discharge process.

5. A method of preventing freezing of a valve in a fuel cell operating system comprising:
a fuel cell;
a fuel gas supplying device which supplies a fuel gas to a side of an anode of the fuel cell;
an oxidizing gas supplying device which supplies an oxidizing gas to a side of a cathode of the fuel cell;
an entrance-side flow path which connects the oxidizing gas supplying device and a gas entrance on the side of the cathode of the fuel cell;
an exit-side flow path which is connected between a gas exit on the side of the cathode of the fuel cell and a side of discharge;
a bypass flow path which connects the entrance-side flow path and the exit-side flow path and which is placed in parallel to the fuel cell;
an adjusting valve which is provided on at least one of the entrance-side flow path and the exit-side flow path and which adjusts a gas flow rate on the side of the cathode;
a bypass valve which is provided on the bypass flow path and which adjusts a gas flow rate in the bypass flow path; and
a controller which controls an operation of the fuel cell, the method comprising the steps of:
detecting and judging that power generation by the fuel cell is stopped; and
opening, after the power generation by the fuel cell is judged to have stopped, the bypass valve and supplying the oxidizing gas through the exit-side flow path and the bypass flow path to an outside air release end, to thereby discharge water present in the exit-side flow path and in the bypass flow path.

* * * * *